3,470,236
PHENYL-N-METHYL CARBAMIC ACID ESTERS
Arnold Hausweiler, Cologne-Flittard, Ingeborg Hammann, Cologne, and Wolfgang Behrenz, Cologne-Stammheim, Germany, assignors to Farbenfabriken Bayer Aktiengesellschaft, Leverkusen, Germany, a corporation of Germany
No Drawing. Filed June 17, 1965, Ser. No. 464,831
Claims priority, application Germany, June 27, 1964,
F 43,288
Int. Cl. C07c *125/06*; A01n *9/20*
U.S. Cl. 260—479                                 11 Claims

The present invention relates to particular phenyl-N-methyl carbamic acid esters which exhibit pesticidal, and especially insecticidal, properties, their compositions, as well as the production and use thereof.

It is already known that carbamic acid esters have insecticidal properties and a few carbamic acid esters have already achieved a considerable degree of importance in practice as insecticides. The most important and most effective carbamic acid esters are believed to include α-naphthyl-N-methyl carbamic acid ester and 1-isopropyl-3-methyl-pyrazolyl-(5)-N-dimethyl carbamic acid ester.

It is an object of the present invention to provide particular phenyl-N-methyl carbamic acid esters which possess valuable properties.

It is another object of the present invention to provide particular new phenyl-N-methyl carbamic acid esters which exhibit pesticidal properties, and especially insecticidal properties, rendering such esters useful in various practical applications.

It is still another object of the present invention to provide such carbamic acid esters which possess a higher degree of potency than presently used carbamic acid esters as regards pesticidal, and in particular insecticidal, action.

It is still a further object of the present invention to provide carbamic acid esters of the foregoing type possessing a distinctly low mammalian toxicity as well as a distinctly low phytotoxicity, yet which possess a particularly strong insecticidal action.

It is another object of the present invention to provide carbamic acid esters of the foregoing type possessing properties which in insecticidal use result in rapidly commenced and long lasting effects.

It is still another object of the present invention to provide compounds of the foregoing type useful in particular against harmful sucking and biting insects, including diptera.

It is still another object of the present invention to provide processes for producing particular phenyl-N-methyl carbamic acid esters of the foregoing type in versatile and efficient manners which lead to comparatively high yields.

It is still another object of the present invention to provide specifically a process for producing carbamic acid esters of the foregoing type, starting from a suitable corresponding phenol and methyl isocyanate whereby a coupling mechanism achieves the production of the desired phenyl-N-methyl carbamic acid ester.

It is still another object of the present invention to provide such a process which may be carried out either in the presence or the absence of solvents and which may be accelerated optionally by the addition thereto of an accelerator such as a tertiary amine.

It is a further object of the present invention to provide such a process which may be carried out at a temperature within a comparatively wide range, including temperatures below room temperature as well as elevated temperatures.

It is still another object of the present invention to provide compositions with carrier vehicles of carbamic acid esters of the foregoing type which may be utilized for pesticidal, and especially insecticidal, purposes.

It is still another object of the present invention to provide such pesticidal or insecticidal compositions in the form of mixtures with a dispersible carrier vehicle, such as a dispersible carrier liquid or dispersible carrier solid, of carbamic acid esters of the foregoing type, which such esters being present in the mixture in a pesticidally effective amount.

It is still another object of the present invention to provide methods of using carbamic acid esters of the instant type in a new way.

It is a further object of the present invention to provide a method of combating pests and/or insects which contemplates applying to such pests and/or insects a pesticidally or insecticidally effective amount of a carbamic acid ester of the instant type.

It is still another object of the present invention to provide a method for combating such pests or insects which contemplates applying the particular carbamic acid ester in the form of a composition with a carrier vehicle, as noted above.

It is a still further object of the present invention to provide for the use of carbamic acid esters of the instant type as hygiene control agents, crop control agents, pesticidal and insecticidal agents in particular, and the like, utilizing comparatively low quantities and/or concentrations of the particular carbamic acid ester in question.

Other and further objects of the present invention will become apparent from a study of the within specification and accompanying examples.

It has now been found in accordance with the present invention that particular phenyl-N-methyl carbamic acid esters of the general formula

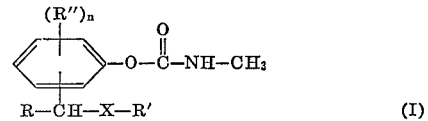

(I)

in which

X represents an oxygen or sulfur atom,
R represents a hydrogen atom or an alkyl radical containing 1–4 carbon atoms,
R' and R", which may be the same or different, represent alkyl radicals containing 1–4 carbon atoms, and
n represents a whole number having a value of 0, 1 or 2, possess strong pesticidal, and especially insecticidal, properties.

The new phenyl-N-methyl carbamic acid esters of general Formula I are obtained in accordance with the present invention, when (a) A phenol of the general formula

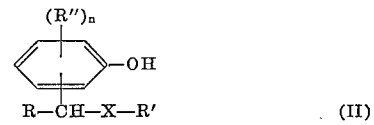

(II)

in which X, R, R', R" and n have the same meanings as noted above, is reacted with methyl isocyanate, or when (b) A phenol of general Formula II is converted, in a first step, with an excess of phosgene into the corresponding chloroformic acid ester and such chloroformic acid ester is then reacted in a second step with methylamine, or when (c) A phenol of general Formula II is reacted, in a first step, with an approximately equimolar amount of phosgene to give the corresponding bis-(phenyl) carbonate and such bis-(phenyl) carbonate is then split in a second step with methylamine.

Surprisingly, the new carbamates produced according to the present invention exhibit a considerably higher insecticidal effectiveness than the carbamates previously known for the same purpose, such as those identified hereinabove.

In accordance with one particular embodiment of the present invention, the course of the reaction according to (a) can be illustrated by the following equation when 2-methoxy-methyl-phenol is used as starting material with methyl isocyanate:

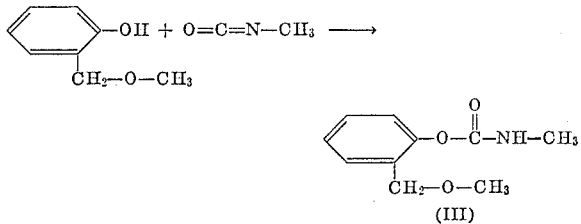

The process in accordance with the present invention may be carried out in an inert solvent, but of course it is also possible if desired directly to react the components in the absence of solvents.

As solvents or dispersing agents, there may be used in accordance with the present invention all inert organic solvents, preferably hydrocarbons, such as aliphatic hydrocarbons or paraffins, including petroleum fractions such as benzine fractions having a boiling point between about 30 and 160° C., especially $C_5$–$C_9$ aliphatic hydrocarbons, and the like; cycloaliphatic hydrocarbons, such as cycloalkyl, and especially cyclo lower alkyl hydrocarbons, including cyclopentane, cyclohexane, and the like; aromatic hydrocarbons, and especially unsubstituted-, as well as mono-, di-, and tri-lower alkyl substituted-, and nitro substituted-mononuclear aryl hydrocarbons having 6 ring carbon atoms, including benzene, toluene, xylene, mesitylene, nitrobenzene, and the like; halogenated aliphatic hydrocarbons, and especially chlorinated aliphatic hydrocarbons, including chlorinated lower alkyl and lower alkenyl hydrocarbons, and especially di-, tri-, and tetra-chloro substituted lower alkyl- and lower alkenyl-hydrocarbons, such as methylene chloride, chloroform, carbon tetrachloride, trichloroethylene, tetrachloroethane, and the like; halogenated aromatic hydrocarbons, such as halogen substituted mononuclear aryl hydrocarbons having 6 ring carbon atoms, including mono-, di-, and tri-chlorobenzene, and the like; ethers, such as open chain and cyclic aliphatic ethers, and especially di-$C_1$–$C_6$ lower alkyl ethers, including dimethyl-, diethyl-, methylethyl-, diisopropyl-, diisobutyl-ether, and the like, as well as cycloalkyl ethers, including dioxan, furan, tetrahydrofuran, and the like; and mixtures of such solvents.

As will be appreciated, the reaction in accordance with the invention may be accelerated by the addition of a tertiary amine, such as triethylamine. Amines in general contemplated as such accelerators encompass heterocyclic amines, and especially cyclic amines having 6 ring members including at least one nitrogen atom, such as pyridine, as well as tertiary aliphatic amines, and especially tertiary alkyl amines, such as tri-$C_1$–$C_6$ lower alkylamines, and especially trimethylamine, triethylamine, diethylmonomethylamine, tripropylamine, tributylamine, methylethylpropylamine, diethyl - butylamine, dimethylcyclohexylamine, and the like, such tri-$C_1$–$C_6$ lower alkylamines thus contemplating those amines having various straight and branched chain substituents, including methyl, ethyl, n-propyl, isopropyl, n-butyl, isobutyl, sec.-butyl, tert.-butyl, the amyls, and the hexyls, as well as $C_5$–$C_6$ cyclolower alkyl substituted amines, including cyclopentyl, cyclohexyl, and the like, and corresponding mixed dialkyl-monocycloalkyl substituted- and monoalkyl-dicycloalkyl substituted- amines wherein the alkyl substituent or substituents and the cycloalkyl substituent or substituents contemplate the foregoing enumerated substituents; and mixtures of such amines.

The reaction temperature in accordance with the process of the present invention can be varied generally within a wide range. For example, the instant process may be carried out at a temperature substantially between about 0 and 150° C.

The particular new compounds according to the present invention, while advantageously having a low mammalian toxicity and a low phytotoxicity, significantly exhibit strong insecticidal actions or effects. The effects commence rapidly and last for a long time. Accordingly, the compounds of the present invention can be used advantageously with good results for combating harmful sucking and biting insects and diptera. The instant compounds because of their good compatibility with higher plants are also particularly useful as plant protective agents, such as in the case where such plants are blighted by various pests and insects.

In this connection, typical sucking insects include, essentially, aphids, such as the peach aphid (*Myzus persicae*), the black bean aphid (*Doralis fabae*), and the like; cocids, such as *Aspidiotus hederae*, *Lecanium hesperidum*, *Pseudococcus maritimus*, and the like; *Thysanoptera*, such as *Hercinothrips femoralis*, and the like; and bugs, such as the beet bug (*Piesma quadrata*) and the bed bug (*Cimex lectularius*), and the like.

Also, typical biting insects include, essentially, butterfly larvae, such as *Plutella maculipennis*, *Lymantria dispar*, and the like; beetles, such as corn beetles (*Calandra granaria*), the Colorado beetle (*Leptinotarsa decemlineata*), but also the species living in the soil, such as wire worms (*Agriotes sp.*) and the cockchafer larvae (*Melolontha melolontha*), and the like; cockroaches, such as the German cockroach (*Blatella germanica*), and the like; *Otheoptera*, such as the cricket (*Gryllus domesticus*), and the like; termites, such as *Reticulitermes*, and the like; and *Hymenoptera*, such as ants, and the like.

Furthermore, the diptera include, in particular, the flies, such as fruit flies (*Drosophila melanogaster*), the Mediterranean fruit fly (*Ceratitis capitata*), the house fly (*Musca domestica*) and gnats, such as the mosquito (*Aedes aegypti*), and the like.

The new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles or asistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocrabons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especialy alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

In general, the compositions or formulations contain substantially between about 0.1 and 95 percent by weight of the active compound, and preferably substantially between about 0.5 and 90 percent by weight.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates, which are thus ready for use. The foregoing compositions or formulations are applied in the usual manner, for example, by spraying, atomizing, vaporizing, watering, scattering, and the like.

The following examples are given for the purpose of illustrating, while not limiting, the present invention, as regards the pesticidal, and especially insecticidal, effectiveness of the instant compounds.

Example 1.—$LT_{100}$ test for diptera

Test insects: *Aedes aegypti*.
Solvent: acetone.

2 parts by weight of the active compound are dissolved in 1,000 parts by volume of solvent. The resultant solution is diluted with a further amount of solvent to provide the desired lower concentration.

2.5 ml. of the solution of the particular active compound are transferred to a Petri dish by means of a pipette, a filter paper of about 9.5 cm. being situated on the bottom of the Petri dish. The Petri dish is left uncovered until the solvent has completely evaporated. The amount of active compound per square meter of filter paper varies with the concentration of the solution of active compound used. About 25 test insects are then placed in the Petri dish which is covered with a glass lid.

The condition of the test insects is continuously observed. The period of time required for a 100% knock down effect is noted.

The test insects, the active compounds, their concentrations and the periods of time which bring about a 100% knockdown effect ($LT_{100}$), can be seen from Table I which follows:

TABLE 1.—$LT_{100}$ TEST FOR DIPTERA

| Active Compound | Test Insect | Concentration of active compound, percent solution | $LT_{100}$ |
|---|---|---|---|
| (III''') $\langle\text{phenyl}\rangle$—O—CO—NH—CH$_3$, CH$_2$—O—CH$_3$ | *Aedes aegypti* | 0.2<br>0.02<br>0.002<br>0.0002 | 60 min.<br>60 min.<br>180 min.<br>3 hrs.=50%. |
| (IV) $\langle\text{phenyl}\rangle$—O—CO—NHCH$_3$, CH$_2$—O—CH(CH$_3$)$_2$ | *Aedes aegypti* | 0.2<br>0.02<br>0.002<br>0.0002 | 60 min.<br>60 min.<br>180 min.<br>>3 hrs.=0%. |
| (V) $\langle\text{phenyl}\rangle$—O—CO—NHCH$_3$, CH$_2$—O—C$_2$H$_5$ | *Aedes aegypti* | 0.2<br>0.02<br>0.002<br>0.0002 | 60 min.<br>60 min.<br>180 min.<br>>3 hrs.=0%. |
| (VI) CH$_3$—$\langle\text{phenyl}\rangle$—O—CO—NHCH$_3$, CH$_2$—O—CH$_3$ | *Aedes aegypti* | 0.2<br>0.02<br>0.002 | 60 min.<br>1.80 min.<br>>3 hrs.=0%. |
| (VII) O—CO—NHCH$_3$ on naphthyl (Known) | *Aedes aegypti* | 0.2<br>0.02 | 180 min.<br>>3 hrs.=0%. |

As will be appreciated from a study of the results of Table 1, utilizing the compounds in accordance with the present invention, a 10 to 100-fold decrease in concentration achieves the same order of effect as the known compound α-naphthyl-N-methyl carbamic acid ester (Formula VII). Accordingly, either a comparable quantity of the instant compounds may be used with respect to that quantity of the known compound heretofore employed for achieving a 100% knock down effect in much less time, or a markedly smaller quantity of the instant compounds may be used to achieve such 100% knock down effect in the same period as a correspondingly larger amount of the known compound.

Example 2.—Plutella test.

Solvent: 3 parts by weight acetone.
Emulsifier: 1 part by weight alkyl-aryl polyglycol ether.

To produce a suitable preparation of the active compound, 1 part by weight of the particular active compound is mixed with the stated amount of solvent, containing the stated amount of emulsifier, and the concentrate which forms is diluted with water to provide the desired concentration.

Cabbage leaves (*Brassica oleracea*) are sprayed with the preparation of the active compound until dew moist, and are then infested with caterpillars of the diamond-back moth (*Plutella maculipennis*).

After the specified period of time, the degree of destruction is determined percentagewise. 100% means that all of the caterpillars are killed, whereas 0% means that none of them are killed.

The active compounds, their concentrations, the evaluation periods of time and the results obtained can be seen from Table 2 as follows:

TABLE 2
[Plant-damaging insects]

| Active Compound | Concentration of active compound in percent | Degree of destruction in percent after 4 days |
|---|---|---|
| (III'''') phenyl with O—CO—NH—CH$_3$ and —CH$_2$—O—CH$_3$ | 0.2 | 100 |
|  | 0.02 | 90 |
| (V') phenyl with O—CO—NH—CH$_3$ and —CH$_2$—O—C$_2$H$_5$ | 0.2 | 100 |
|  | 0.02 | 90 |
| (VIII) phenyl with O—CO—NH—CH$_3$ and —CH$_2$—S—CH$_3$ | 0.2 | 90 |
|  | 0.02 | 80 |
| (IX) phenyl with O—CO—NH—CH$_3$ and —CH$_2$—O—CH$_2$—CH(CH$_3$)$_2$ | 0.2 | 100 |
|  | 0.02 | 20 |
| (X) CH$_3$-pyrazolyl with —O—CO—N(CH$_3$)$_2$ and CH—(CH$_3$)$_2$ (Known) | 0.2 | 90 |
|  | 0.02 | 0 |

From the foregoing data, it will be seen that at the same concentration of 0.02%, the instant compounds lead to a 20 to 90% result, i.e. degree of destruction, as compared with the known compound 1-isopropyl-3-methyl-pyrazolyl-(5)-N-dimethyl carbamic acid ester (compound X), which shows a degree of destruction of 0%. Accordingly, less of the instant compounds need be used than the amount of known compound for achieving a better insecticidal effect or, at the same concentration, a much higher degree of insecticidal effect is achievable as compared with that of the known compound.

Example 3.—Myzus test (contact action)

Solvent: 3 parts by weight acetone.

Emulsifier: 1 part by weight alkyl-aryl polyglycol ether.

To produce a suitable preparation of the active compound, 1 part by weight of the particular active compound is mixed with the stated amount of solvent, containing the stated amount of emulsifier, and the concentrate which forms is diluted with water to provide the desired concentration.

Cabbage plants (*Brassica oleracea*), which have been heavily infested with peach aphids (*Myzus persicae*), are sprayed with the preparation of the active compound until dripping wet.

After the specified periods of time, the degree of destruction is determined percentagewise. 100% means that all of the aphids are killed, whereas 0% means that none of them are killed.

The active compounds, their concentrations, the evaluation periods of time and the results obtained can be seen from Table 3 as follows:

TABLE 3
[Plant-damaging insects]

| Active Compound | Concentration of active compound in percent | Degree of destruction in percent after 24 hours |
|---|---|---|
| (VIII') phenyl with O—CO—NH—CH$_3$ and —CH$_2$—S—CH$_3$ | 0.2 | 100 |
|  | 0.02 | 100 |
|  | 0.002 | 90 |
| (VI') phenyl with O—CO—NH—CH$_3$, —CH$_2$—O—CH$_3$, and CH$_3$ | 0.2 | 100 |
|  | 0.02 | 99 |
| (III''''') phenyl with O—CO—NH—CH$_3$ and —CH$_2$—O—CH$_3$ | 0.2 | 100 |
|  | 0.02 | 60 |
| (V'') phenyl with O—CO—NH—CH$_3$ and —CH$_2$—O—C$_2$H$_5$ | 0.2 | 100 |
| (IV') phenyl with O—CO—NH—CH$_3$ and —CH$_2$—O—CH(CH$_3$)$_2$ | 0.2 | 80 |
| (VII') naphthyl with O—CO—NH—CH$_3$ (Known) | 0.2 | 40 |

In consequence of the foregoing, it will be seen that at the same concentration, the instant compounds provide a 2 to 2.5-fold better effect than that of the known compound α-naphthyl-N-methyl carbamic acid ester (compound VII). Significantly, it should also be noted that at a 10 to 100-fold decrease in concentration as compared with that of the known compound, a better insecticidal effect is still achieved. Accordingly, markedly less of the instant compounds may be used for pesticidal, and especially insecticidal, action or effect, as compared with the amount of the known compound needed for such purposes.

The following examples are given for the purpose of illustrating, while not limiting, the present invention, as regards the process for preparing the instant compounds.

Example 4

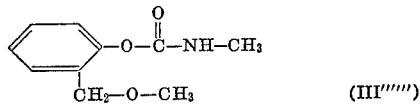
(III''''')

13.8 g. (0.1 mol) of methyl-(2-hydroxy-benzyl) ether are dissolved in anhydrous benzene and the resulting solution is first mixed with 6.3 g. (0.11 mol) of methyl isocyanate and subsequently with 3 drops of triethylamine. A reaction commences, with warming up of the reaction mixture. After stirring for two hours at 50° C., the benzene solution is cooled to 0° C. and the product which crystallizes out (2-methoxy-methylphenyl-N-methyl carbamic acid ester) is isolated and recrystallized from ligroin (M.P.: 50° C.). The yield is at least 90% of theory.

The methyl-(2-hydroxy-benzyl) ether used a starting material (B.P. 128–130° C./40 mm. Hg) is produced by the diazotization of methyl-(2-amino-benzyl) ether and the decomposition of the diazonium salt (Annalen der Chemie, 305, 110).

Example 5

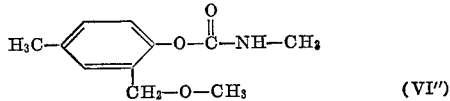
(VI'')

Under reaction conditions analogous to those of Example 4, there is obtained from 15.2 g. (0.1 mol) methyl-(2-hydroxy-4-methyl benzyl) ether and 6.3 g. (0.11 mol) methyl isocyanate, the corresponding carbamic acid ester, i.e., 2-methoxymethyl-4-methyl-phenyl N-methyl carbamic acid ester, (M.P. 44–46° C.). The yield is at least 90% of theory.

Example 6

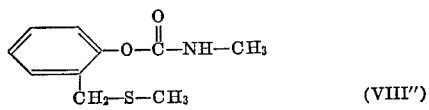
(VIII'')

Under reaction conditions analogous to those of Example 4, there is obtained from 17 g (0.1 mol) methyl-(2-hydroxy-benzyl) thioether and 6.3 g. (0.11 mol) methyl isocyanate, the corresponding carbamic acid ester, i.e., 2-methylmercaptomethylphenyl N-methyl carbamic acid ester (M.P. 47–49° C.). The yield is at least 90% of theory.

The methyl-(2-hydroxy-benzyl) thioether used as starting material is produced by decomposition of the corresponding diazonium salt (see Example 4).

Example 7

The procedure of Example 4 is repeated, using corresponding molar amounts of 2-isopropoxy-methyl-phenol, 2-ethoxy-methyl-phenol, and 2-isobutoxy-methyl-phenol, respectively, with methyl isocyanate, and the corresponding carbamic acid ester is produced, i.e., 2-isopropoxy-methyl-phenyl-N-methyl carbamic acid ester (compound IV), 2-ethoxy-methyl-phenyl-N-methyl carbamic acid ester (compound V), and 2-isobutoxy-methyl-phenyl-N-methyl carbamic acid ester (compound IX).

Example 8

In accordance with the procedure of Example 6, using corresponding molar amounts of 2-isopropylmercapto-methyl-phenol, 2-ethylmercapto-methyl-phenol, 2-isobutyl-mercapto-methyl-phenol, and 2-methylmercapto-methyl-4-methyl-phenol, respectively, with methyl isocyanate, the corresponding carbamic acid ester is produced, i.e., 2-isopropyl-mercapto-methyl-phenyl-N-methyl carbamic acid ester, 2-ethyl-mercapto-methyl-phenyl-N-methyl carbamic acid ester, 2-isobutyl-mercapto-methyl-phenyl-N-methyl carbamic acid ester, and 2-methylmercapto-methyl-4-methyl-phenyl-N-methyl carbamic acid ester.

Each of the phenol starting materials of Examples 7 and 8 is produced in accordance with the procedure noted in Example 4, and all of such final compounds possess the desired pesticidal, and especially insecticidal, action with low attendant mammalian toxicity and low phytotoxicity.

As will be seen from the foregoing, the present invention is directed to a process for producing in particular alkoxymethylphenyl and alkylmercaptomethylphenyl N-methyl carbamic acid esters having the general formula

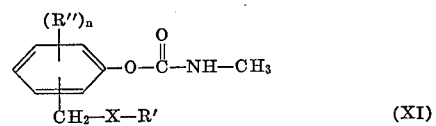
(XI)

in which X is selected from the group consisting of oxygen and sulfur, R' and R'' each respectively is selected from the group consisting of $C_1$-$C_4$ alkyl, and $n$ is a whole number having a value from 0 to 2, which comprises reacting a phenol having the general formula

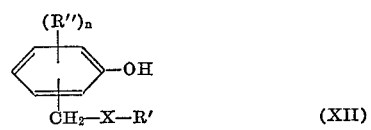
(XII)

in which X, R', and R'' and $n$ are the same as defined above, with methyl isocyanate, to form the corresponding phenyl-N-methyl carbamic acid ester.

Such process may be carried out is desired in the presence of an inert organic solvent and, if desired, also in the presence of a tertiary amine as reaction accelerator, using preferably a temperature substantially between about 0 and 150° C. Accordingly, N-methyl carbamic acid esters of the type noted in Formula XI are produced. These contemplate in particular:

alkoxymethylphenyl N-methyl carbamic acid esters having the formula

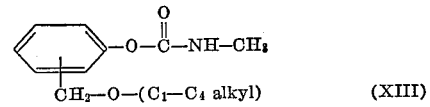
(XIII)

as well as alkoxymethylphenyl N-methyl carbamic acid esters having the formula

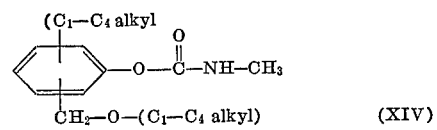
(XIV)

as well as alkylmercaptomethylphenyl N-methyl carbamic acid esters having the formula

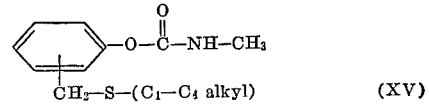
(XV)

as well as alkylmercaptomethylphenyl N-methyl carbamic acid esters having the formula

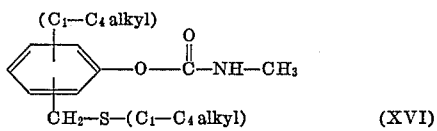

(XVI)

Such compounds includes especially 2-methoxymethyl-phenyl N-methyl carbamic acid ester (compound III), 2-isopropoxymethylphenyl N-methyl carbamic acid ester (compound IV), 2-ethoxymethylphenyl N-methyl carbamic acid ester (compound V), 2-methoxymethyl-4-methylphenyl N-methyl carbamic acid ester (compound VI), 2-isobutoxymethylphenyl N-methyl carbamic acid ester (compound IX), and 2 - methylmercaptomethylphenyl N-methyl carbamic acid ester (compound VIII).

In this connection, pesticidal compositions comprising a mixture of a carrier vehicle, such as a dispersible carrier liquid or a dispersible carrier solid, and a pesticidally effective amount of a compound of the instant type may be utilized. Such mixtures may contain, broadly speaking, the phenyl N-methyl carbamic acid ester in an amount substantially between about 0.00005–95% by weight of the mixture, such as commercially prepared mixtures containing 0.1–95% by weight of the instant active compound as well as field-applicable mixtures containing 0.00005–2.0% by weight, and especially 0.0002–1.0% by weight, of the instant compound.

In this same connection, the invention contemplates, of course, a method of combating pests, and especially insects, which comprises applying to such pests, and especially insects, and their habitat a pesticidally, and especially insecticidally, effective amount of a compound of the instant type, either alone or in the form of a mixture with a carrier vehicle of the type noted above, for example in an amount substantially between about .00005–2% by weight of the mixture.

Preferably, in the foregoing formulae R' represents $C_1$–$C_4$ alkyl, such as methyl, ethyl, n-propyl, isopropyl, n-butyl, sec.-butyl, tert.-butyl, and the like, while R'', i.e., when n has a value of 1 or 2, represents mono- or di-$C_1$–$C_4$ alkyl, including the same or mixed $C_1$–$C_4$ alkyl, such as those substituents enumerated under R', as well as mixtures of any two thereof in the case where n has a value of 2. Of course, X may be oxygen or sulfur. All of the foregoing compounds coming within the purview of the present invention, and especially those having the preferred definitions of R' and R'' noted, possess the desired insecticidal effectiveness coupled with a low mammalian toxicity and a low phytotoxicity, whereby such compounds are eminently suitable for use as pesticides, and especially insecticides, capable of wide application. Because of their good compatibility with higher plants, the instant compounds are of significant usefulness in crop control procedures whereby to rid agricultural crops, for example, of various insects.

Also contemplated broadly in accordance with the present invention is a process for producing alkoxy-alkyl-phenyl and alkylmercaptoalkyl-phenyl N-carbamic acid esters having general Formula I, which comprises reacing a phenol having the Formula II with methyl isocyanate, whereby to form the corresponding phenyl-N-methyl carbamic acid ester, utilizing the foregoing reaction conditions, such as particular temperatures and, optionally, a solvent and/or reaction accelerator, as noted above. In this regard, of course, R in Formula I, for instance, may be selected from the group consisting of hydrogen and $C_1$–$C_4$ alkyl, such $C_1$–$C_4$ alkyl being desirably methyl, ethyl, n-propyl, isopropyl, n-butyl, isobutyl, sec.-butyl, tert.-butyl, and the like, whereby the alkoxy-alkyl or alkylmercapto-alkyl substituent on the phenyl radical will have the alkoxy or alkylmercapto group attached to the alpha-atom of the alkyl group linking such alkoxy or alkylmercapto group to the phenyl radical in question.

Besides alkoxymethylphenyl N-methyl carbamic acid esters, and alkylmercaptomethylphenyl N-methyl carbamic acid esters, having Formulae XIII, XIV, XV and XVI, and the like, also contemplated are alkoxy-α-alkylphenyl N-methyl carbamic acid esters having the general formula

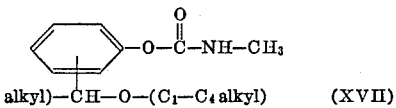

(XVII)

as well as alkylmercapto-α-alkylphenyl N-methyl carbamic acid esters having the general formula

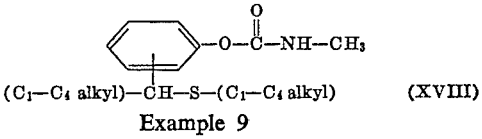

(XVIII)

Example 9

The procedure of Example 4 is repeated, using corresponding molar amounts of 2-(α-methoxy)-ethyl-phenol, 2-(α-ethoxy)-ethyl-phenol, 2-(α-isopropoxy)-ethyl-phenol, 2-(α-n-butoxy)-ethyl-phenol, and 2-(α-tert.-butoxy)-ethyl-phenol, respectively, with methyl isocyanate; using corresponding molar amounts of 2-(α-methoxy)-n-propyl-phenol, 2-(α-ethoxy)-n-propyl-phenol, 2-(α-isopropoxy)-n-propyl-phenol, 2-(α-n-butoxy)-n-propyl-phenol, and 2-(α-tert.-butoxy-n-propyl-phenol, respectively, with methyl isocyanate; using corresponding molar amounts of 2-(α-methoxy)-isobutyl-phenol, 2-(α-ethoxy)-isobutyl-phenol, 2-(α-isopropoxy)-isobutyl-phenol, 2-(α-n-butoxy)-isobutyl-phenol, and 2-(α-tert.-butoxy)-isobutyl-phenol, respectively, with methyl isocyanate; using corresponding molar amounts of 2-(α-methoxy)-n-pentyl-phenol, 2-(α-ethoxy)-n-pentyl-phenol, 2-(α-isopropoxy)-n-pentyl-phenol, 2-(α-n-butoxy)-n-pentyl-phenol, and 2-(α-tert.-butoxy)-n-pentyl-phenol, respectively, with methyl isocyanate; and the corresponding carbamic acid ester is produced, as the case may be, i.e.:

2 - (α - methoxy)-ethyl-phenyl - N - methyl carbamic acid ester, 2-(α-ethoxy)-ethyl - phenyl - N - methyl carbamic acid ester, 2-(α-isopropoxy)-ethyl - phenyl - N - methyl carbamic acid ester, 2-(α - n - butoxy)-ethyl-phenyl-N-methyl carbamic acid ester, and 2-(α - tert. - butoxy)-ethyl-phenyl-N-methyl carbamic acid ester;

2-(α-methoxy) - isobutyl - phenyl - N - methyl carbamic acid ester, 2-(α - ethoxy) - n - propyl-phenyl-N-methyl carbamic acid ester, 2-(α-isopropoxy)-n-propyl-phenyl-N-methyl carbamic acid ester, 2-(α-n-butoxy)-n-propyl-phenyl - N - methyl carbamic acid ester, and 2-(α-tert.-butoxy) - n - propyl-phenyl - N - methyl carbamic acid ester;

2-(α-methoxy) - isobutyl - phenyl - N - methyl carbamic acid ester, 2-(α-ethoxy) - isobutyl - phenyl - N - methyl carbamic acid ester, 2-(α-isopropoxy) - isobutyl-phenyl-N-methyl carbamic acid ester, 2-(α-n-butoxy)-isobutyl-phenyl - N - methyl carbamic acid ester, and 2-(α-tert.-butoxy)-isobutyl-phenyl-N-methyl carbamic acid ester; and 2-(α-methoxy) - n - pentyl-phenyl - N - methyl carbamic acid ester, 2-(α-ethoxy) - n - pentyl-phenyl-N-methyl carbamic acid ester, 2-(α-isopropoxy)-n-pentyl-phenyl-N-methyl carbamic acid ester, 2-(α-n-butoxy)-n-pentyl-phenyl - N - methyl carbamic acid ester, and 2-(α-tert.-butoxy)-n-pentyl-phenyl-N-methyl carbamic acid ester.

Example 10

The procedure of Example 6 is repeated, using corresponding molar amounts of 2-(α-methylmercapto)-ethyl-phenol, 2-(α-ethylmercapto)-ethyl-phenol, 2-(α-isopropyl-mercapto)-ethyl-phenol, 2-(α - n - butylmercapto)-ethyl-phenol, and 2-(α-tert.-butoxy)-ethyl-phenol, with methyl isocyanate, and the corresponding carbamic acid ester is produced, i.e., 2-(α-methylmercapto)-ethyl-phenyl-N-methyl carbamic acid ester, 2-(α-ethylmercapto)-ethyl-phenyl-N-methyl carbamic acid ester, 2-(α-isopropyl-mercapto)-ethyl-phenyl-N-methyl carbamic acid ester, 2-(α-n-butylmercapto)-ethyl-phenyl-N-methyl carbamic acid ester, and 2-(α-tert.-butoxy)-ethyl-phenyl-N-methyl carbamic acid ester, as the case may be.

Each of the phenol starting materials of Examples 9 and 10 is produced in accordance with the procedure noted in Example 4, and all of such final compounds possess the desired pesticidal, and especially insecticidal, action with low attendant mammalian toxicity and low phytotoxicity.

It will be appreciated that the alkoxy-alkyl or alkylmercapto-alkyl and the separate alkyl substituent (R'') where $n$ is 1 or 2 may be positioned at any ring position on the phenyl radical, and that all of such isomers possess the desired pesticidal, and especially insecticidal, activity, coupled with low mammalian toxicity and low phytotoxicity.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phenyl N-methyl carbamic acid esters having the general formula

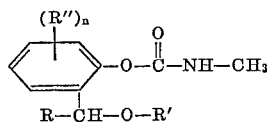

in which R is selected from the group consisting of hydrogen and $C_1$-$C_4$ alkyl, R' and R'' each respectively is selected from the group consisting of $C_1$-$C_4$ alkyl, and $n$ is a whole number having a value from 0 to 2.

2. Alkoxy-α-alkylphenyl N-methyl carbamic acid esters having the general formula

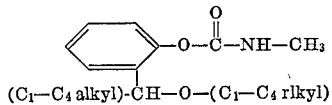

3. Ester according to claim 1 wherein such compound has the formula:

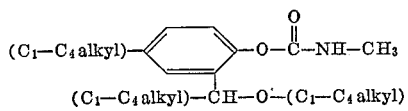

4. Phenyl N-methyl carbamic acid esters having the general formula

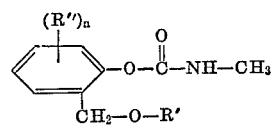

in which R' and R'' each respectively is selected from the group consisting of $C_1$–$C_4$ alkyl, and $n$ is a whole number having a value from 0 to 2.

5. Alkoxymethylphenyl N-methyl carbamic acid esters having the formula

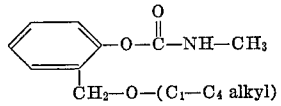

6. Alkoxymethylphenyl N-methyl carbamic acid esters having the formula

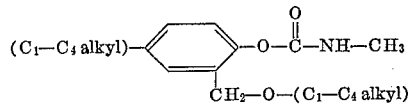

7. 2-methoxymethylphenyl N-methyl carbamic acid ester having the formula

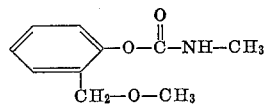

8. 2-isopropoxymethylphenyl N-methyl carbamic acid ester having the formula

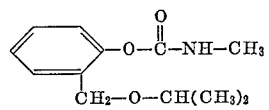

9. 2-ethoxymethylphenyl N-methyl carbamic acid ester having the formula

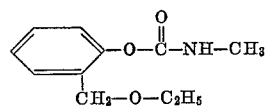

10. 2-methoxymethyl-4-methyl-phenyl N-methyl carbamic acid ester having the formula

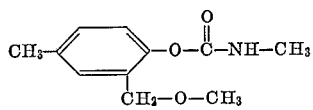

11. 2-isobutoxymethylphenyl N-methyl carbamic acid ester having the formula

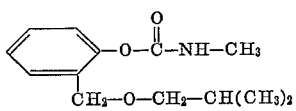

References Cited

UNITED STATES PATENTS

| | | |
|---|---|---|
| 3,206,502 | 9/1965 | Heiss et al. |
| 3,349,116 | 10/1967 | Weil et al. _____ 260—479 |
| 2,485,550 | 10/1949 | Aeschlimann et al. |
| 2,776,197 | 1/1957 | Gysin et al. |

FOREIGN PATENTS 912,895  12/1962  Great Britain.

OTHER REFERENCES

Kolbezen et al., Journal of Agricultural and Food Chemistry, vol. 2, pp. 864–870 (1954).

LORRAINE A. WEINBERGER, Primary Examiner

M. G. BERGER, Assistant Examiner

U.S. Cl. X.R.

260—613, 609; 424—300

PO-1050
(5/69)

UNITED STATES PATENT OFFICE
CERTIFICATE OF CORRECTION

Patent No. 3,470,236      Dated September 30, 1969

Inventor(s) Arnold Hausweiler, Ingeborg Hammann and Wolfgang Behrenz

It is certified that error appears in the above-identified patent and that said Letters Patent are hereby corrected as shown below:

Column 4, line 23, "cocids" should be --coccids--; column 4, line 36, "Otheoptera" should be --Orthoptera--; column 6, in Table 1, Formula (VI) under the heading "$LT_{100}$", "1.80 min." should be --180 min.--; column 10, line 44, "is desired" should be --if desired--; column 11, line 39, ".00005-" should be -- 0.00005- --; column 12, line 30, insert a closing parenthesis after "butoxy"; column 12, line 48, "-isobutyl-" should be -- -n-propyl- --; column 13, line 48, in the structural formula "rlkyl" should be --alkyl--; column 14, all the U.S. references cited should have the cross-reference --260-479C--

SIGNED AND
SEALED
MAY 19 1970

(SEAL)
Attest:

Edward M. Fletcher, Jr.
Attesting Officer

WILLIAM E. SCHUYLER, JR.
Commissioner of Patents

Disclaimer 3,470,236.—*Arnold Hausweiler*, Cologne-Flittard, *Ingeborg Hammann*, Cologne, and *Wolfgang Behrenz*, Cologne-Stammheim, Germany. PHENYL-N-METHYL CARBAMIC ACID ESTERS. Patent dated Sept. 30, 1969. Disclaimer filed June 29, 1973, by the assignee, *Farbenfabriken Bayer AG*.

Hereby enters this disclaimer to claim 7 of said patent.

[*Official Gazette September 4, 1973.*]